United States Patent [19]

Schera, Jr.

[11] 4,071,114
[45] Jan. 31, 1978

[54] MOTION OPERATED POWER APPARATUS

[76] Inventor: Enos L. Schera, Jr., 8254 S.W. 37 St., Miami, Fla. 33155

[21] Appl. No.: 670,697

[22] Filed: Mar. 26, 1976

Related U.S. Application Data

[63] Continuation-in-part of Ser. No. 566,027, April 7, 1975, abandoned.

[51] Int. Cl.² .............................................. F03B 13/12
[52] U.S. Cl. ....................................... 185/30; 290/53; 185/27; 60/501; 60/721
[58] Field of Search ............ 417/211, 211.5, 330–332; 60/495–507, 398; 290/42, 43, 53, 54, 721; 185/27, 30

[56] References Cited

U.S. PATENT DOCUMENTS 3,644,062  2/1972  Cozic ................................... 417/211
3,774,048  11/1973  Hardingham ......................... 290/42

FOREIGN PATENT DOCUMENTS 108,781  3/1924  Switzerland ........................ 60/501
235,508  6/1925  United Kingdom ................. 60/501

*Primary Examiner*—Robert K. Schaefer
*Assistant Examiner*—John W. Redman
*Attorney, Agent, or Firm*—Oltman and Flynn

[57] ABSTRACT

A shaft-driven power device, such as an electric generator or pump, is mounted on a base which is subjected to fluctuating movements, such as those of waves in a body of water or those of an automotive vehicle. An input shaft at the upper end of the power device is connected by a rigid arm to an off-center weight located just slightly above the base. The weight may be adjustable and replaceable. The power device may be spring-mounted on the base.

7 Claims, 5 Drawing Figures

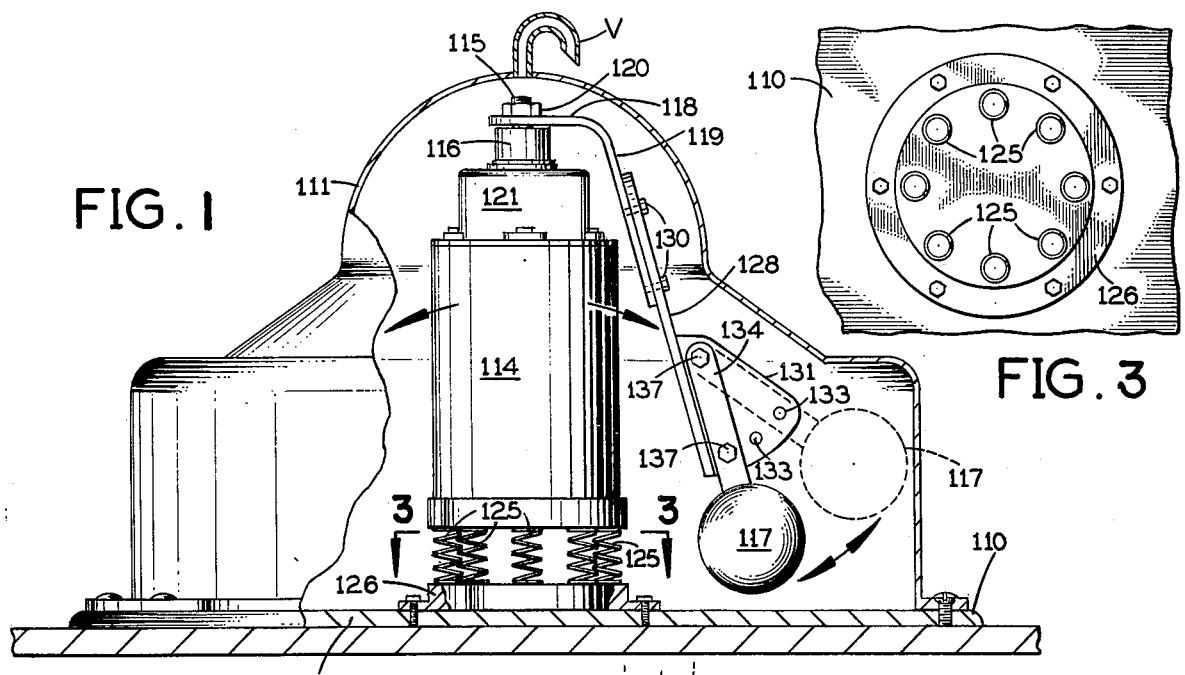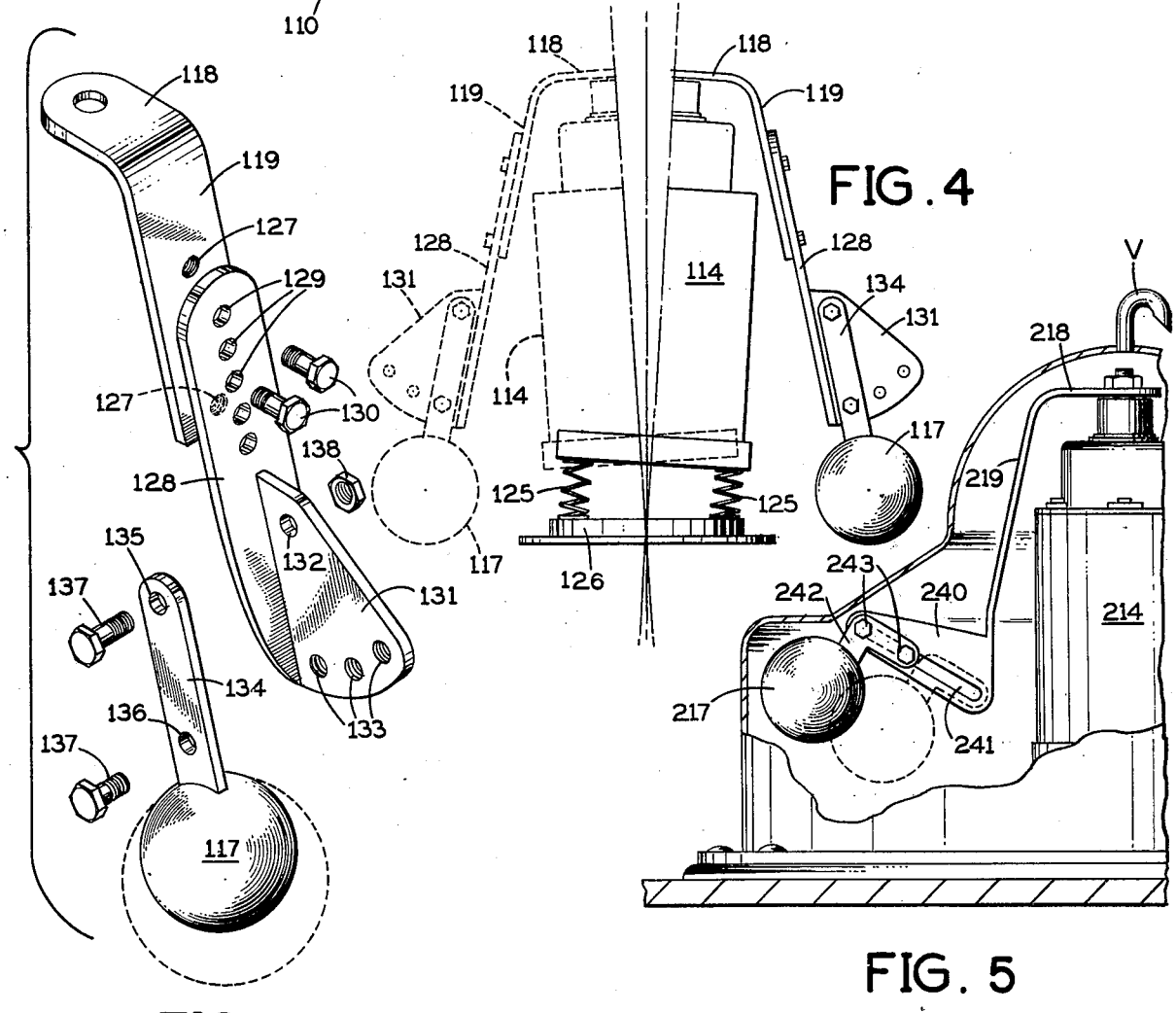

MOTION OPERATED POWER APPARATUS

CROSS REFERENCE TO RELATED APPLICATION

This application is a continuation-in-part of my co-pending U.S. patent application, Ser. No. 566,027, filed Apr. 7, 1975, now abandoned.

BACKGROUND OF THE INVENTION

Various arrangements have been proposed heretofore for converting the wave motion in a body of water into useful work. For example, U.S. Pat. No. 3,231,749 to Hinck and U.S. Pat. No. 3,774,058 to Hardingham both use the revolving movement of an off-center weight to drive an electric generator or other shaft-driven power device.

SUMMARY OF THE INVENTION

The present invention is directed to a novel apparatus for converting fluctuating movements, such as wave motion in a body of water, into rotation of a shaft which may be used to drive an electric generator, pump, or other shaft-operated power device. This apparatus includes a movable base which carries the power device and an eccentric weight connected through an offset arm to the input shaft to the power device and located so close to the base as not to tend appreciably to tip the assembly over or make it top heavy. The weight and/or the connecting arm may be adjustable for optimum performance under different operating conditions. The shaft-operated power device may be spring-mounted on the base to enhance the conversion of fluctuating movements of the base into revolving movements of the off-center weight.

The principal object of this invention is to provide a novel and improved apparatus for converting fluctuating movements, such as wave motion in a body of water, into useful work, either electrical or mechanical.

Further objects and advantages of this invention will become apparent from the following detailed description of certain presently preferred embodiments thereof, shown schematically in the accompanying drawings in which:

FIG. 1 is an elevational view of a first embodiment of the present apparatus, with a portion of the outer casing broken away for clarity;

FIG. 2 is an exploded perspective view of the adjustable arm and weight in the FIG. 1 apparatus;

FIG. 3 is a horizontal cross-section taken along the line 3—3 in FIG. 1 at the springs which mount the shaft-driven power device on the base;

FIG. 4 is a fragmentary elevation illustrating rocking of the spring-mounted power device; and FIG. 5 is a fragmentary elevation, with part of the housing broken away, of a second embodiment of the present apparatus.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

Referring first to FIG. 1, the present apparatus has a flat platform or base 110 which preferably is designed for attachment to a water buoy so as to be supported by and move in unison with the buoy, or for mounting on a boat to be subjected to the wave-induced motions of the boat. Alternatively, the base 110 may be designed for attachment to an automotive land vehicle to receive the latter's fluctuating movements, or it may be designed to float in the water. A genually dome-shaped casing 111 with a transverse flange at the bottom is bolted to the top of the base 110.

The cylindrical casing of an electric generator, pump or other shaft-driven power device 114 extends upward away from the base 110 inside the casing 111. The rotational axis of this shaft-driven power device coincides with a centerline extending perpendicular to the base 110.

A rotatable input shaft 115 for the shaft-driven power device 114 is located above the casing of the latter. Preferably, this input shaft is coupled to the shaft of the power-driven device by a one-way clutch 116 and a gear reduction 121, both of known design, which impart the rotation of the input shaft 115 at higher speed to the shaft of the power-driven device 114 only in one direction of rotation of the input shaft 115. In the other direction, this clutch permits shaft 115 to rotate freely without driving the shaft-driven power device 114. The axis of input shaft 115 coincides with the aforementioned centerline and the axis of the driven device 114. When the base 110 is horizontal, shaft 115 is vertical.

In accordance with the present invention, an eccentric weight 117, here shown as a ball, is attached to the input shaft 115 through a rigid coupling arm having a top piece with a short segment 118 at its upper end which extends laterally outward from the upper end of the input shaft 115. The outer end of segment 118 is joined integrally to a downwardly and outwardly inclined segment 119 of the top piece of the coupling arm. The upper end segment 118 of the coupling top piece of the arm may be releasably clamped to the input shaft 115 by a nut 120 threaded onto the upper end of this shaft.

The casing of a shaft-driven power device 114 rests on a plurality of circumferentially spaced coil springs 125, which extend up from a mounting plate 126 fastened to the base 110. These springs 125 are sufficiently yieldable that the shaft-driven power device 114 normally can tilt toward the side where the eccentric weight 117 is located. The springs 125 provide a yieldable connection between the base 110 and the power device 114 so that the power device does not remain perpendicular to the base at all times, but can rock or tilt with respect to the base because of the combined effects of the off-center position of the weight 117 and whatever wave motion or other fluctuating movements are being imparted to the base 110. The overall effect is to enhance the tendency of the weight to revolve in response to such fluctuating movements.

The rigid coupling arm for the eccentric weight 117 in this embodiment is adjustable in length. To this end, the arm is of two-piece construction, with aforementioned to piece 118, 119 having at least two screw-threaded bolt holes 127 (FIG. 2) spaced apart along its downwardly and outwardly inclined segment 119, and with its lower piece 128 having a series of openings 129 spaced apart along its length for selective registration of a pair of the openings 129 with the two threaded holes 127 in the top piece.

After the desired length adjustment has been made, the bolts 130 are inserted through the selected pair of openings 129 in the bottom piece 128 of the coupling arm into the threaded holes 127 in the top piece 118, 119 of the coupling arm to clamp the two halves of the coupling arm together.

At its lower end, the bottom piece 128 of the coupling arm carries an outwardly projecting, transverse plate 131 having a single opening 132 near its upper end and an arcuately arranged series of screw-threaded bolt holes 133 near its lower end. The weight 117 is on the lower end of a flat arm 134 having an upper opening 135 for registration with the upper plate opening 132 and a lower opening 136 for registration selectively with one of the lower bolt holes 133. A bolt 137 and nut 138 are provided at the upper set of openings 132, 135. A bolt 137 is provided at the lower opening 136 and the bolt holes 133.

With this arrangement, the arm 134 can be set at any one of several angular positions (FIG. 1) so as to position the eccentric weight 117 the desired distance laterally outward from the axis of the input shaft 115 to the power device 114.

Preferably, a series of different sized weights 117, each with its own mounting arm 134, may be provided so that the user can modify the operation of the apparatus by changing weights, as well as by adjusting the off-center position of the weight and the length of its two-piece coupling arm.

FIG. 5 shows another embodiment in which a one-piece coupling arm 218, 219 is provided with a laterally outwardly protruding extension 240 on its lower end. This extension is formed with an elongated slot 241. The eccentric weight 217 is connected to a generally L-shaped arm 242 having two openings for clamping bolts 243, which pass through the slot 241 and carry nuts (not shown) on the opposite side of the lower end extension 240 on the coupling arm 218, 219.

After loosening these nuts, the weight 217 may be adjusted to the desired lateral position outward from the axis of the input shaft 215 to the power device 214, after which the nuts may be tightened to clamp the weight in this position.

In both the embodiment of FIGS. 1–4 and the embodiment of FIG. 5, an inverted generally U-shaped vent V is mounted on the top of the housing for venting to the atmosphere any gases which may tend to accumulate inside the housing. This avoids the possibility of an explosion caused by sparking or arcing of the power-driven device 114 or 214 in the presence of explosive gases.

In both embodiments the base of the present apparatus may be mounted on an automobile or truck in such a manner that vehicle turns or the reaction of the vehicle when it accelerates or when the brakes are applied will impart movement to the base and cause the off-center weight to revolve as described.

It will be evident that the coupling arm positions the off-center weight very close vertically to the base (just slightly above the base), thereby keeping the center of gravity of the apparatus much lower than it would be if the weight were at the same elevation as the upper end of the input shaft. This is advantageous in that it reduces any tendency for the waves to tip the apparatus over, as might happen if its center of gravity were too high, and it enables the use of a heavier weight with a consequent increase in the input power response to the wave motion. The appreciably off-center position of the weight with respect to the rotational axis of the input shaft enables wave motion to cause the weight to revolve in one direction or the other angularly about the axis of the shaft and thereby cause the shaft to turn by the same angular amount.

It is to be understood that the inclined segment of the coupling arm may make an appreciably greater angle with the axis of the input shaft than the relatively small angle shown in the drawing. For example, this angle may be about 45°.

When the apparatus is used in the water, the base will rock with respect to the horizontal in response to waves in the body of water. Such rocking motion of the base will tilt the axis of the input shaft with respect to the vertical, and the eccentric weight will revolve about this axis in one direction or the other and impart a corresponding rotation to the input shaft. All rotational movements of input shaft in one direction will be imparted to the shaft of the electric generator, pump or other shaft-driven device, thereby converting the wave motion into electrical or mechanical power for doing useful work.

I claim:

1. In an apparatus for converting fluctuating movements into useful work comprising:
    a base adapted to rock in response to fluctuating movements;
    a shaft-driven power device supported from said base and extending above said base;
    and a rotatable input shaft extending up from said power device and operatively coupled in driving relationship to the latter;
the improvement which comprises the combination of:
    a weight located off-center from said input shaft and closely above said base at an elevation substantially closer to the base than to said input shaft;
    a rigid coupling arm connected to said input shaft above said power device and extending laterally outward from said input shaft across the top of said power device and downward to one side of said power device, said coupling arm at its lower end carrying said weight so that the weight revolves about the axis of the input shaft and imparts rotation to the input shaft in response to rocking of the base, said weight having an unobstructed path through which it can revolve about the axis of the input shaft; and
    yieldable means mounting said power device on said base.

2. An apparatus according to claim 1 wherein said yieldable means comprises a plurality of coil springs mounting said power device on said base.

3. In an apparatus for converting fluctuating movements into useful work comprising:
    a base adapted to rock in response to fluctuating movements;
    a shaft-driven power device supported from said base and extending above said base;
    and a rotatable input shaft extending up from said power device and operatively coupled in driving relationship to the latter;
the improvement which comrpises the combination of:
    a weight located off-center from said input shaft and closely above said base at an elevation substantially closer to the base than to said input shaft;
    a rigid coupling arm connected to said input shaft above said power device and extending laterally outward from said input shaft across the top of said power device and downward to one side of said power device, said coupling arm at its lower end carrying said weight so that the weight revolves about the axis of the input shaft and imparts rotation to the input shaft in response to rocking of the base, said weight having an unobstructed path through which it can revolve about the axis of the input shaft; and means for selectively adjusting the length of said coupling arm.

4. In an apparatus for converting fluctuating movements into useful work comprising:
- a base adapted to rock in response to fluctuating movements;
- a shaft-driven power device supported from said base and extending above said base;
- and a rotatable input shaft extending up from said power device and operatively coupled in driving relationship to the latter;

the improvement which comprises the combination of:
- a weight located off-center from said input shaft and closely above said base at an elevation substantially closer to the base than to said input shaft;
- a rigid coupling arm connected to said input shaft above said power device and extending laterally outward from said input shaft across the top of said power device and downward to one side of said power device, said coupling arm at its lower end carrying said weight so that the weight revolves about the axis of the input shaft and imparts rotation to the input shaft in response to rocking of the base, said weight having an unobstructed path through which it can revolve about the axis of the input shaft; and
- means for selectively adjusting the lateral position of said weight off-center from said input shaft.

5. In an apparatus for converting fluctuating movements into useful work comprising:
- a base adapted to rock in response to fluctuating movements;
- a shaft-driven power device supported from said base and extending above said base;
- and a rotatable input shaft extending up from said power device and operatively coupled in driving relationship to the latter;

the improvement which comprises the combination of:
- a weight located off-center from said input shaft and closely above said base at an elevation substantially closer to the base than to said input shaft;
- a rigid coupling arm connected to said input shaft above said power device and extending laterally outward from said input shaft across the top of said power device and downward to one side of said power device, said coupling arm at its lower end carrying said weight so that the weight revolves about the axis of the input shaft and imparts rotation to the input shaft in response to rocking of the base, said weight having an unobstructed path through which it can revolve about the axis of the input shaft; and
- said coupling arm comprising top and bottom pieces and means for adjusting said top piece along said bottom piece;
- means for detachably connecting said weight to said bottom piece of said coupling arm.

6. In an apparatus for converting fluctuating movements into useful work comprising:
- a base adapted to rock in response to fluctuating movements;
- a shaft-driven power device supported from said base and extending above said base;
- and a rotatable input shaft extending up from said power device and operatively coupled in driving relationship to the latter;

the improvement which comprises the combination of:
- a weight located off-center from said input shaft and closely above said base at an elevation substantially closer to the base than to said input shaft;
- a rigid coupling arm connected to said input shaft above said power device and extending laterally outward from said input shaft across the top of said power device and downward to one side of said power device, said coupling arm at its lower end carrying said weight so that the weight revolves about the axis of the input shaft and imparts rotation to the input shaft in response to rocking of the base, said weight having an unobstructed path through which it can revolve about the axis of the input shaft;
- means for selectively adjusting said weight on said coupling arm;
- and coil springs mounting said power device on said base.

7. An apparatus according to claim 6, wherein said weight is adjustable on said coupling arm laterally off-center from said input shaft.

* * * * *